United States Patent
Chen et al.

(10) Patent No.: US 8,116,781 B2
(45) Date of Patent: Feb. 14, 2012

(54) METHOD AND SYSTEM OF MANAGING WIRELESS RESOURCES

(75) Inventors: Xixian Chen, Nepean (CA); Xiao-Dong Li, Nepean (CA); James Weisert, Calgary (CA); Qiang Yuan, Calgary (CA); Miroslav Budic, Murphy, TX (US)

(73) Assignee: Rockstar Bidco LP, New York, NY (US)

( * ) Notice: Subject to any disclaimer, the term of this patent is extended or adjusted under 35 U.S.C. 154(b) by 848 days.

(21) Appl. No.: 11/311,260

(22) Filed: Dec. 20, 2005

(65) Prior Publication Data

US 2006/0215600 A1 Sep. 28, 2006

Related U.S. Application Data

(60) Provisional application No. 60/665,738, filed on Mar. 28, 2005.

(51) Int. Cl.
*H04W 72/00* (2009.01)
(52) U.S. Cl. .................................. 455/452.2; 370/328
(58) Field of Classification Search .................. 370/328; 455/452.2
See application file for complete search history.

(56) References Cited

U.S. PATENT DOCUMENTS

| | | | |
|---|---|---|---|
| 5,687,167 A | 11/1997 | Bertin et al. | |
| 5,881,050 A * | 3/1999 | Chevalier et al. | 370/230 |
| 6,125,396 A * | 9/2000 | Lowe | 709/234 |
| 6,487,289 B1 * | 11/2002 | Phan et al. | 379/243 |
| 6,571,102 B1 * | 5/2003 | Hogberg et al. | 455/450 |
| 6,584,315 B1 * | 6/2003 | Kang et al. | 455/442 |
| 6,738,637 B1 | 5/2004 | Marinho et al. | |
| 7,218,630 B1 * | 5/2007 | Rahman | 370/355 |
| 2004/0116141 A1 * | 6/2004 | Loven et al. | 455/519 |
| 2006/0039381 A1 * | 2/2006 | Anschutz et al. | 370/395.21 |
| 2006/0135172 A1 * | 6/2006 | Dronne et al. | 455/452.2 |

* cited by examiner

*Primary Examiner* — Olumide T Ajibade Akonai
*Assistant Examiner* — Jaime Holliday
(74) *Attorney, Agent, or Firm* — Barnes & Thornburg LLP (57) ABSTRACT

The invention provides for the management of wireless resources, which can reduce call blocking by allowing high priority services, under suitable conditions, to use resources allocated to low priority services. Thus high priority services can pre-empt the usage of wireless resources by low priority services. This has the advantage of reducing call blocking for high priority calls, while permitting low priority calls to have more access to radio resources than conventional systems with the same call blocking rate. Thus a base station can implement a preemption mechanism that would reclaim Walsh Code and Forward Power resources from an active Supplemental Channel (SCH) burst in order to accommodate incoming Fundamental Channel (FCH) requests.

20 Claims, 8 Drawing Sheets

METHOD AND SYSTEM OF MANAGING WIRELESS RESOURCES

CROSS REFERENCE TO RELATED APPLICATIONS

This application claims the benefit of Priority of U.S. Provisional Patent Application No. 60/665,738 filed Mar.28, 2005, which Is Incorporated herein by reference.

FIELD OF THE INVENTION

The present invention relates generally to wireless networks. More particularly, the present invention relates to a method and system of managing wireless resources between different services.

BACKGROUND OF THE INVENTION

In the CDMA 1xRTT system, the forward radio resources, which include Walsh Code (WC) and Power, are shared by Voice channels and Data channels. Further more, there are two sub-types of data channels, namely Fundamental Channels (FCH) and Supplemental Channels (SCH).

Data calls or sessions can be divided into those which have a real-time packet transmission requirement, and those which do not. For example, a voice call requires real-time transmission in order to maintain the interactive nature of a conversation, whereas a file download or email message does not. Call types with a real-time requirement include Push-to-Talk (PTT) sessions and Voice over IP (VoIP) telephone calls. Note that real-time actually implies near real-time; and should be understood to require transmission without noticeable delay. Due to the nature of conversations, and the way speech is packetized, the packets do not actually need to be transmitted instantaneously as long as the speech is received at the far end without any noticeable delay.

Many data sessions without a real-time requirement desire higher bandwidth than is required for a typical VoIP call, but can withstand noticeable delays between the transmission of packets, and still be successfully received. Typically such transmissions are called bursty in nature, as they typically receive a series of packets in bursts, with gaps or delays between each burst. A file transfer is one example. There is no real-time requirement, as the receiving application can simply wait out any delays in transmission, but the bandwidth requirement is higher than a typical voice call, as there is more data that needs transmission than is required by a VoIP call. Every data call or session requires a data FCH, and those data calls or sessions which do not have a real time requirement, but which require higher bandwidth than can be provided by an FCH call, require one or more SCH bursts as required. The former defines the number of data users in a sector while the later provides additional data throughput per user.

One problem with this division of channels is that the demand for resources for data calls is inherently variable. Some services will require large data transfers. This can take a substantial amount of resources over a short period of time, or it can take a smaller amount of resources spread over a longer duration. It is desirable to allow variable transfer rates, in order to maximize resource utilization. If there is heavy demand for resources during some periods of time, and less in others, it is desirable to provide significant bandwidth to a file transfer during non-busy periods, in order to free up resources during busier periods. This will obviously reduce waiting time for users who perform data transfers during less busy periods. In order to ensure sufficient bandwidth for data transfers, conventional network design reserves a minimum amount of resources for the SCH.

However, a problem with permitting variable transfer rates is that data transfers, once commenced, can utilize a significant share of resources. This can lead to insufficient resources available to new requests for services once such a transfer commences, leading to blocked calls.

In order to provide minimum service levels, resources are typically partitioned by a base station resource manager in order to ensure a minimum level of service is available to all 3 types of channels (namely the voice FCH channels (VCs), the data FCHs and data SCHs).

This typically implies that there is an upper limit to the amount of resources (i.e., WC and power) used by each of the VC's, FCHs and SCHs. In other words the resources are partitioned between the VC's, FCHs and SCHs. While this tends to satisfy the requirement of ensuring minimum service levels for each set of channels, and also tends to allow data transfers while still allowing a specified minimum number of data calls, this often does not lead to the maximal use of resources. Furthermore, if the resources for each Channel type are fully utilized, any new request for service that requires such a channel will be blocked. This can happen even if there are substantial unused resources being reserved by the other channel types.

It is difficult to solve this problem without favoring one service (i.e., channel type) over another. For example, one approach, as will be discussed below with reference to FIG. 1, favors SCH throughput at the expense of number of data users (FCH).

Thus, there is a need for a better system of managing resources to avoid unnecessary call blocking, while providing for minimum levels of service.

SUMMARY OF THE INVENTION

The invention provides for the management of wireless resources, which can reduce call blocking by allowing high priority services, under suitable conditions, to use resources allocated to low priority services. Thus high priority services can pre-empt the usage of wireless resources by low priority services. This has the advantage of reducing call blocking for high priority calls, while permitting low priority calls to have more access to radio resources than conventional systems with the same call blocking rate.

Thus, a broad aspect of the invention provides a method of allocating wireless resources at a base station comprising: Comparing resource usage with available resources to determine whether sufficient resources are available for an incoming high priority service; and If insufficient resources are available for said incoming service, pre-empting a low priority service in order to make sufficient resources available.

An example of a typical high priority service is a data call with a real-time requirement, or is delay sensitive. An example of a typical low priority service is a data call without a real-time requirement or a non delay sensitive service. However the operator of the base station may wish to configure their network in order to be able to specify what is a high priority versus low priority call or service. For example a file transfer is typically non delay sensitive. However an operator may wish to classify a particular file transfer as a high priority service, for example if it is for a client who has negotiated a high quality of service, or in the case of an emergency transmission.

One embodiment of the invention implements a preemption mechanism that would allow a base station (BTS) to reclaim Walsh Code and Forward Power resources from an active SCH burst in order to accommodate incoming FCH requests. Unlike a hard partition, such a system is adaptive, allowing for the re-allocation of resources within a "soft" partition space, based on demand at that period of time. It is preferable to reserve a minimum level of resources as a "head room", for high priority data calls (e.g., VOIP, PTT, etc.).

Advantageously, such a system provides the operator with the ability to allow tradeoff between maximization of the number of data users per sector and per sector throughput. This capability is particularly important for support of Push to Talk (PTT) or VoIP which typically require data FCH.

According to an aspect of the invention, the BTS can manage the availability of WC and Forward Power resources for FCH requests by configurable resource partitioning and reservation. Such a system implements a preemption mechanism at the BTS that preempts SCH bursts to ensure that incoming FCH requests have necessary WC and Forward Power resources available as long as the FCH usage has not exceeded an upper limit. Said upper limit may be pre-defined—but it can be configurable.

According to one embodiment of the invention, once the system receives an FCH request (which can be a request for a new call, or for a hand-off), the system will grant the request provide sufficient FCH resources are available. Advantageously, if sufficient FCH resources are not currently available, the system will determine if one or more SCH bursts can be pre-empted in order to provide the needed resources to satisfy the FCH request. If so, one or more SCH calls are pre-empted. According to one embodiment of the invention, a pre-emption request results in an SCH burst being dropped. An alternative embodiment does not drop an SCH call if the needed resources can be provided by decreasing the bandwidth available to one or more SCH sessions.

According to an embodiment, once a pre-emption request is made, the system evaluates a service metric for each SCH session to determine which SCH session(s) is pre-empted. This Service metric typically includes the Quality of Service provided to the user, but can also factor any latency requirements, the relative size of the SCH transmissions, and the relative completeness of such transmissions.

According to an aspect of the invention there is provided a base station comprising: a. means for receiving a request for a data session; b. means for comparing resource usage with available resources to determine whether sufficient resources are available; c. means for allocating the resources if available to satisfy said request; and d. If insufficient resources are available for said call, means for determining whether sufficient resources can be made available by pre-empting a session without a real-time requirement, and means for pre-empting such a session in order to make the resources available to satisfy said request.

According to a further aspect of the invention there is provided a method of allocating resources between delay sensitive services and non delay sensitive services, comprising: a. Establishing a first threshold for said delay sensitive services and a second threshold for said non delay sensitive services; b. Allocating resources to each service on an as requested basis provided neither threshold is reached; c. If said second threshold is reached and there is additional demand for said non delay sensitive services and said first threshold is not reached, then allocating resources to said non delay sensitive services beyond said second threshold; and d. If resources are allocated to said non delay sensitive services beyond said second threshold, and said first threshold is not reached and there is demand for said first service for which there are insufficient resources available, then allocating resources to said delay sensitive services by pre-empting resources from said non delay sensitive services.

A further aspect of the invention provides a computer-readable storage medium comprising a program element for execution by a processor within a base station, the program element comprising computer-readable program code for comparing resource usage with available resources to determine whether sufficient resources are available for an incoming high priority service, and if insufficient resources are available for said incoming service, pre-empting a low priority service in order to make sufficient resources available.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

We will discuss preferred embodiments of the invention with reference to CDMA 1xRTT systems whose primary radio resources include Walsh Code (WC) and Power, and which utilize VC's, FCHs and SCHs. However, it should be appreciated that the invention is applicable to other types of systems which allocate resources to different services.

The forward radio resources, i.e. Walsh Code (WC) and Power, used by Voice and Data calls are partitioned by a Radio Resource Manager (RRM) at the BTS. A conventional RRM algorithm utilizes the following 3 user-configurable parameters to partition WC and Forward Power between voice and data calls.

1. MaxVoiceResources—defines the upper limit for the resources available for Voice calls as a % of the total resources.
2. MaxDataResources—defines the upper limit for the resources available for Data calls as a % of the total resources.
3. MaxDataFCHResources—defines the upper limit for the resources available for Data Fundamental Channels (FCH) as a % of total Data resources (MaxDataResources).

These parameters allow the operator to limit the FCH usage (by setting MaxDataFCHResources appropriately) and thereby reserving the remaining data resources, (MaxDataResources−MaxDataFCHResources), for SCH usage. While the FCH usage is limited, the SCH usage is not. As third generation cellular systems were being designed to include VC's, FCHs and SCHs, voice calls were predominantly circuit switched (and therefore used VC's) and data calls were typically bursty in nature. Therefore, it was envisioned that most calls would either require VC's or SCH's. This led to network design which was biased to reserve minimal resources for SCH's, but not FCH's Thus this implementation favors throughput (SCH )at the expense of the number of data users (FCH).

Figure 1:
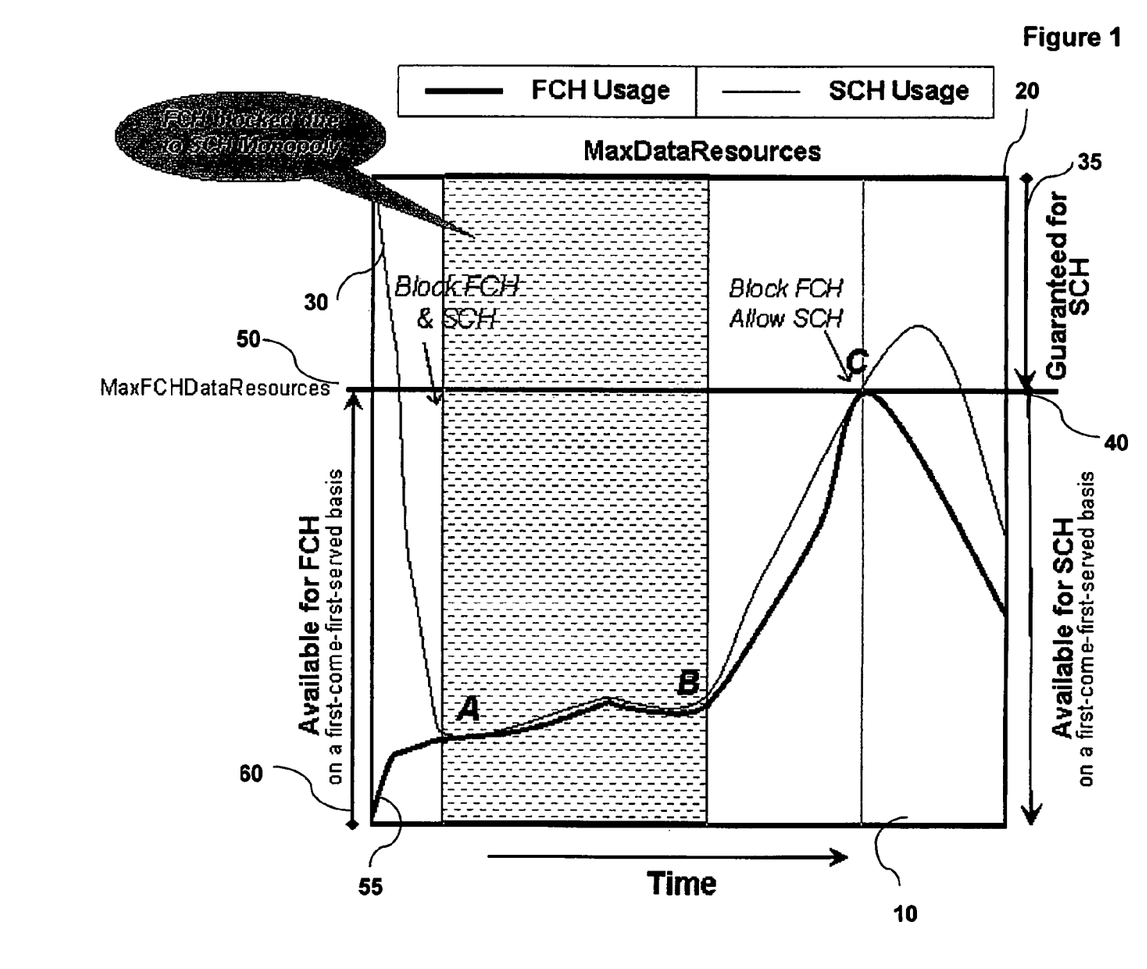
FIG. 1 is a schematic drawing illustrating a problem with prior art systems.

As a result, traffic with heavy SCH load could consume most of the data resources and allow very little resource for FCH usage. This would lead to FCH requests being blocked due to lack of data resources as a result of SCH monopoly, even though FCH usage has not reached its upper limit. FIG. 1 illustrates this scenario.

FIG. 1 shows the partition of data resources between FCH and SCH (but not the VC's which will also have a reserved allocation of resources). In this figure, the box 10 represents the total data resources available, as defined by MaxDataResources 20. MaxDataFCHResources 50 defines the upper limit of resources available to FCH. Utilization of resources by SCHs is illustrated from the top down by the thin line 30. In other words points on line 30 illustrate the resources used by the SCHs, with points at the top of the figure representing zero utilization, and resource utilization by the SCH's increases as the line 30 moves away from the top of the figure. Thus the arrow at the far right of the FIG. 35 illustrates the resources guaranteed for SCH extends from the top of the figure to point 40, which corresponds to MaxDataFCHResources 50. The arrow extends downwards below point 40, but resources below this point are not reserved for SCH, and are thus available on a first-come, first served basis.

Utilization of resources by FCHs is illustrated from the bottom up by the thick line 55. In other words points on line 55 illustrate the resources used by the FCHs, with points at the bottom of the figure representing zero utilization, and resource utilization by the FCH's increases as line 55 moves away from the bottom of the figure.

Thus, the system is at full utilization of the data resources at points where the SCH resource line 30 meets the FCH line 55.

As shown in the figure by the arrow 60 at the left, the data resources for FCH are not guaranteed to the FCH, but are available on a first-come-first-served basis between FCH users and SCH users.

Between points A and B, all new data calls are blocked due to full utilization. This is referred to as SCH monopoly, as the SCH is utilizing the majority of the data resources. This can be seen as line 30 descends far below the demarcation line 40. This is considered to block FCH calls, as data resources available to FCHs are used by the SCH.

At point B, as SCH usage goes down, data resources become available and FCH requests are granted. At point C, FCH gets blocked due to FCH usage reaching its upper limit. The current implementation does not provide any guarantee on the availability of WC and forward power for FCH and hence new FCH requests could be denied even when the FCH usage is very low. With the increasing use of critical applications, like PTT and VoIP, that require FCH only, operators have a need to be able to maximize the number of FCH data calls by guaranteeing the partitioned FCH WC and forward power resources for FCH usage.

However, as discussed above, making MaxDataFCHResources a hard partition is not a satisfactory solution, as this will be often result in under-utilizing resources. This can be seen in FIG. 1, where all points left of A, or to the right of B (except at point C) would have unused resources (which could have been used by the SCH) if MaxDataFCHResources was a hard partition.

Hence it is an objective of our solution to make MaxDataFCHResources available to FCH when needed by FCH users, but make unused resources available to SCH until they are needed by FCH.

Figure 2:
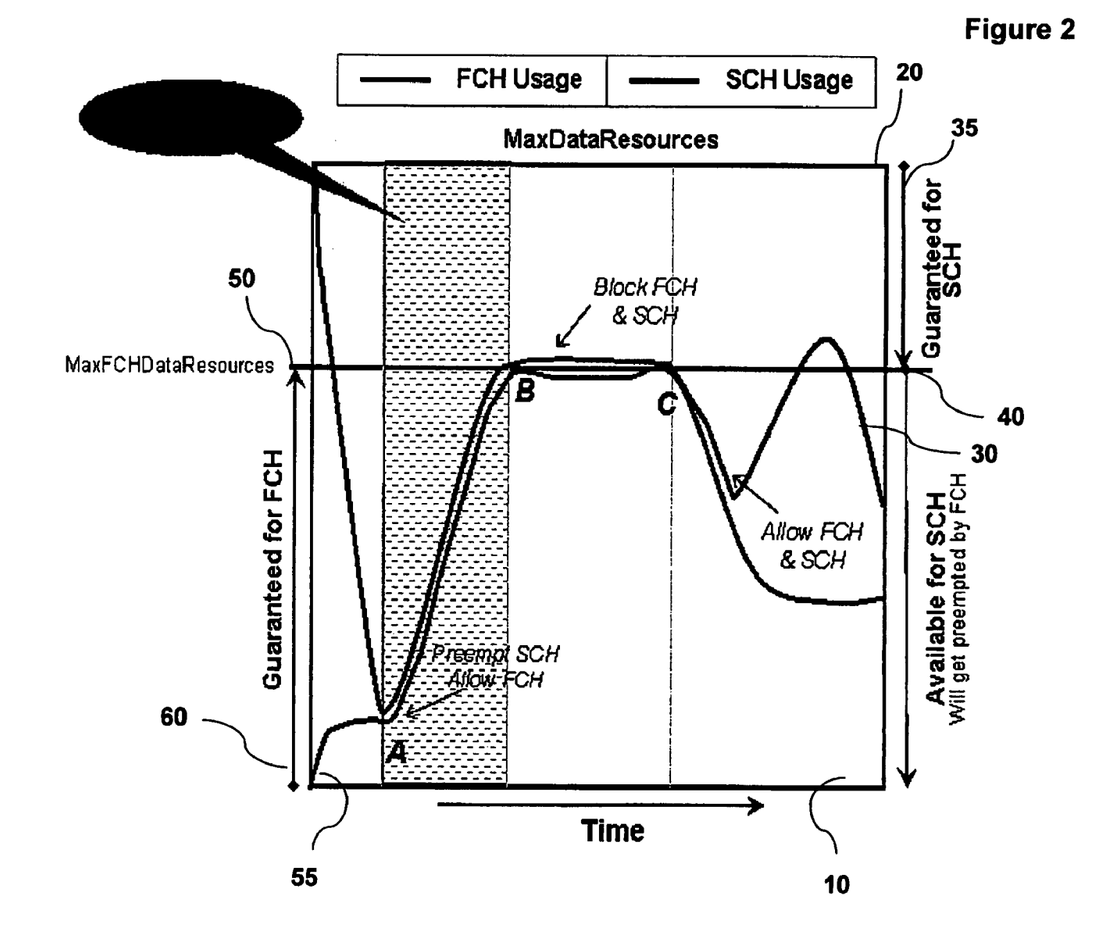
FIG. 2 is a schematic drawing illustrating better performance according to an embodiment of the invention.

According to a preferred embodiment of the invention, this is accomplished by allowing SCH to use resources below the MaxDataFCHResources point when needed by the SCH, but will pre-empt the use of SCH resources below MaxDataFCHResources when they are needed by FCH. This is illustrated in FIG. 2. In FIG. 2, SCH is allowed to use all of the resources it needs, until point A as FCH does not require the resources used by SCH. Between points A and C, full resource utilization is achieved. Between points A and B, FCH has not used all of its guaranteed resources, but some of those resources are used by SCH. Therefore, some portion of resources used by SCH are pre-empted in order to make the guaranteed resources available to FCH. As FCH's demand for resources increases, more SCH resources are pre-empted until point B is reached. After point B, pre-emption of SCH resources stops. Between points B and C, all new data calls are blocked, as both FCH and SCH have used all of their guaranteed resources Preferably the system reserves some amount of resources to handle FCH requests, in order to ensure new FCH call requests are not blocked when SCH uses resources that are supposed to be reserved for FCH. We refer to these resources as "head room" resources. Thus, in the example shown in FIG. 2, the system reserves "head room" at least between points A and B, in order to allow pre-emption. According to one embodiment, this can be implemented as follows. FCHHeadRoomResources is introduced as a BTS sector attribute to provide headroom resources (Walsh code and Power) to prevent blocking of FCH when its usage is less than MaxDataFCHResources. FCHHeadRoomResources Contains Two Parameters:

1. FCHHeadRoomPower: Power reserved for not blocking FCH (in unit of percentage of MaxPower).
2. FCHHeadRoomWalshCodes: Number of Walsh Codes with length of 128 reserved for not blocking FCH Both the Walsh code and power head rooms should be adaptively changed based on the usage of FCH. For example, the required head room reserved for FCH will be decreased as the FCH resources usage approaches MaxFCHResources. If FCH resources usage reaches MaxFCHResources, for example, between points B and C in FIG. 2, the BTS does not need to reserve head room for FCH. The required FCHHeadroomResources can be calculated based on the following formulas:

RequiredFCHHeadroomResources=min(CurrentAvailableFCHResources, FCHHeadRoomResources)  1.

CurrentAvailableFCHResources=MaxFCHResources−CurrentFCHResourcesUsage

Figure 3:
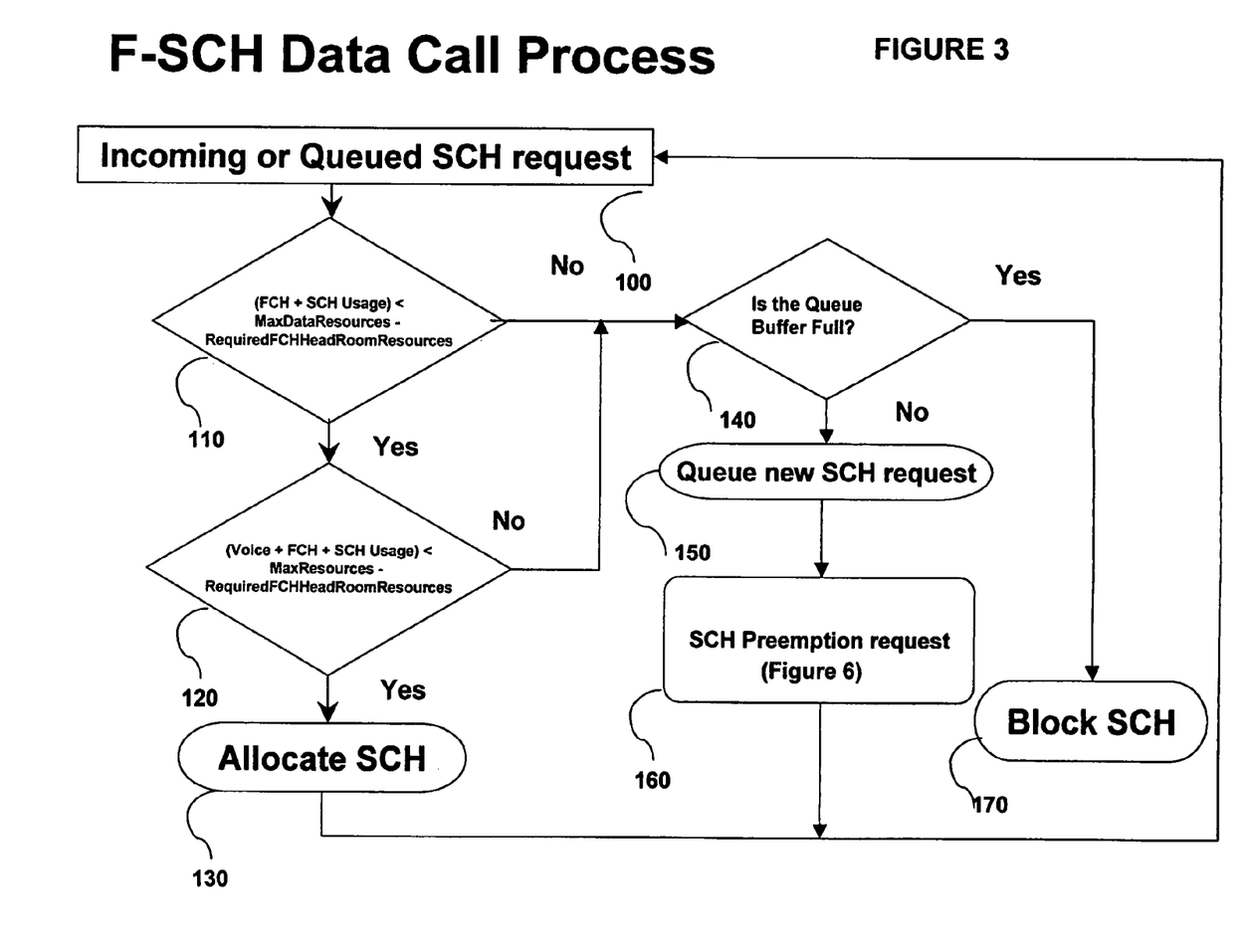
FIG. 3 is a flowchart illustrating a portion of the process carried out by an embodiment of the invention.

FIG. 3 is a flow chart illustrating a F-SCH Data call process executed by a base station controller, according to an embodiment of the invention. For an Incoming or Queued SCH request 100, the system first compares FCH and SCH usage with the Maximum data resources which can be allocated (i.e., MaxDataResources less headroom) 110. This step determines whether there are sufficient data resources for the incoming request.

Next step is to check total resources, including the voice channel. (Voice+FCH+SCH Usage)<MaxResources−RequiredFCHHeadRoomResources) 120. This is used in systems that allow the voice channels to encroach on the Data channel resources in order to ensure a voice call is not dropped. In other words two conditions must be met before an incoming SCH request. Namely the system checks that the allocated data resources do not exceed the maximum data resources, and the total resources (including voice) do not exceed the maximum system resources.

Assuming both conditions are met, this implies there are sufficient resources available to satisfy the incoming request, so the appropriate resources are allocated to the incoming SCH request in the conventional manner 130.

If either condition is not met, than traditionally the incoming request would be blocked. However, we have recognized that blocking requests is not satisfactory, especially if there is a way to provide service to all users in the area (or to provide an appropriate minimum level of service to users in the area, depending on their requirements and level of service agreements). Thus, according to this embodiment of the invention, the system determines if there is room in the Queue buffer 140. If the Queue Buffer is full, then the incoming request is blocked 170. However, if there is room in the Queue, the new SCH request is placed in the Queue 150, and a preemption request is executed 160, which will be discussed below with reference to FIG. 6.

Figure 4:
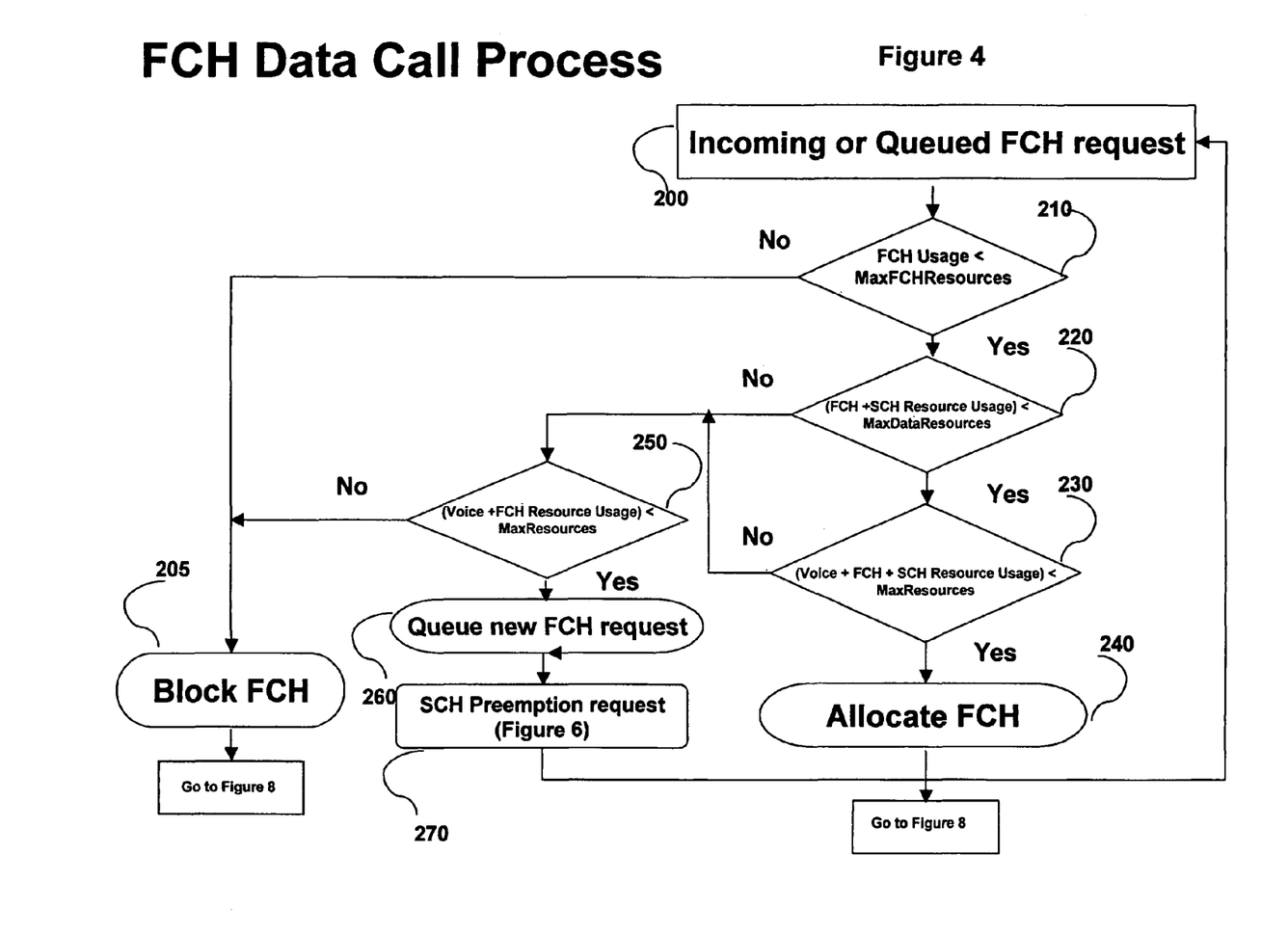
FIG. 4 is a flowchart illustrating a further portion of the process carried out by an embodiment of the invention.

We now discuss the FCH data call process illustrated in FIG. 4, according to an embodiment of the invention. For an incoming or queued FCH request 200, the BTS first compares the FCH usage with a MaxFCHResources threshold 210 to determine whether any new FCH can be allocated. MaxFCHResources is a configurable threshold managed by the BTS to ensure that a minimum desired level of resources is left available to the Supplemental Channel. If no such minimum is required, than this step can be omitted (or the threshold is set to the MaxdataResources threshold, or preferably, in order to reserve a minimum head room, it is set to MaxdataResources−RequiredFCHHeadRoomResources).

Figure 8:
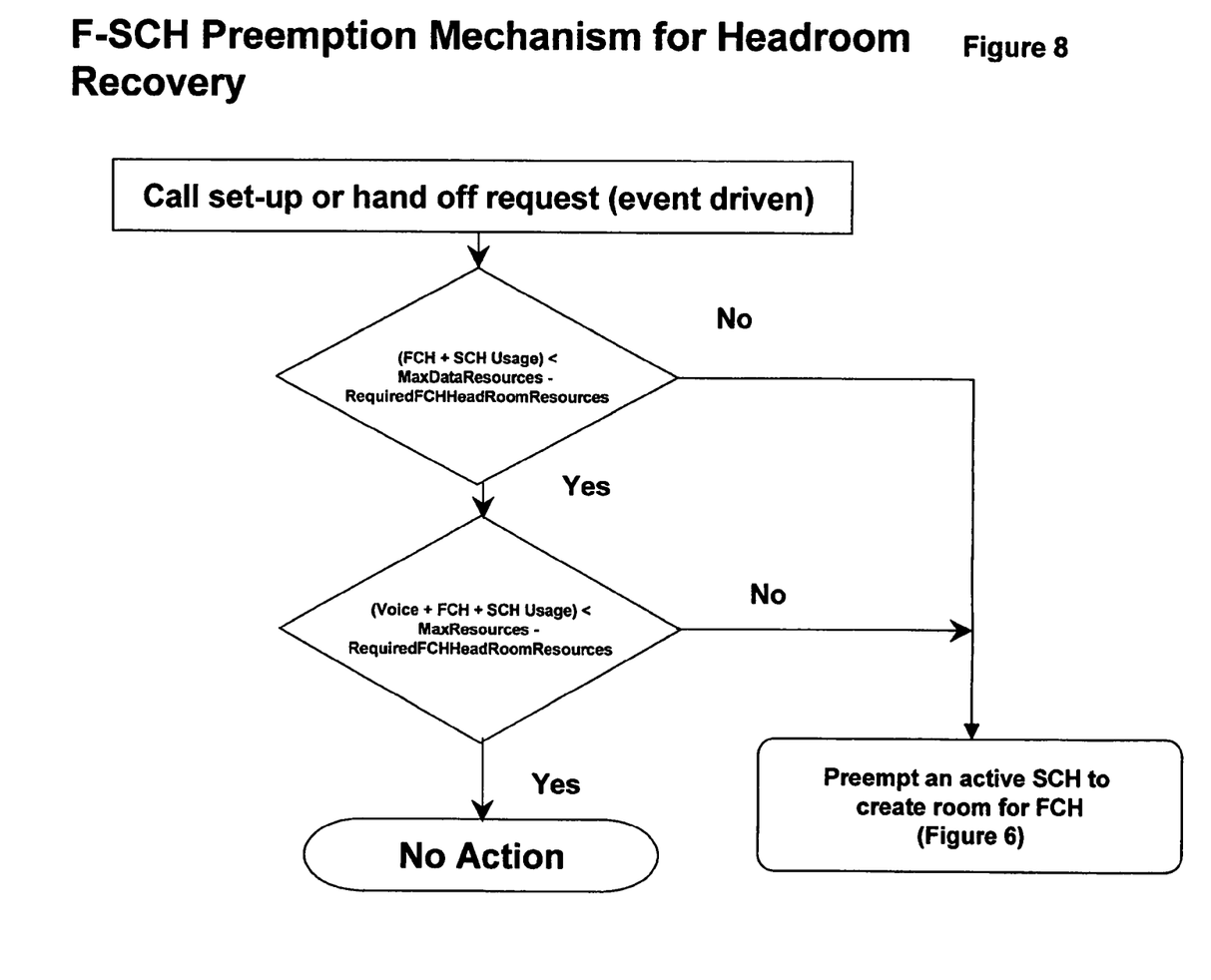
FIG. 8 is a flowchart illustrating a further portion of the process carried out by an embodiment of the invention.

If there is insufficient resources, then the FCH request is blocked 205, and the process will then proceed to pre-empt an SCH if necessasary to ensure that sufficient headroom is maintained, as shown in FIG. 8.

Assuming the MaxFCHResources has not been exceeded, then the system checks whether there are sufficient resources to allocate the FCH. First, the system checks whether the Data usage exceeds the Maximum available Data resources 220. Then it checks to see if the total usage (Data+Voice) exceeds the Maximum available Total resources (Data+Voice) 230. If there are sufficient resources, then the FCH is allocated in the conventional manner 240.

Once again, if either check fails, then FCH would typically be blocked in conventional systems.

Our system does not automatically block the FCH. Rather, it determines whether it is possible to allocate some resources from the SCH in order to allow the FCH request. To do this the system determines whether real time traffic (i.e. voice+FCH Resource Usage) already exceeds the MaxResources 250. If yes, then there is insufficient resources that can be allocated to the FCH request, so the FCH is blocked 205. As an alternative to 250 (not shown), it could check whether SCH usage has exceeded a threshold (MaxSCHResources).

Figure 5:
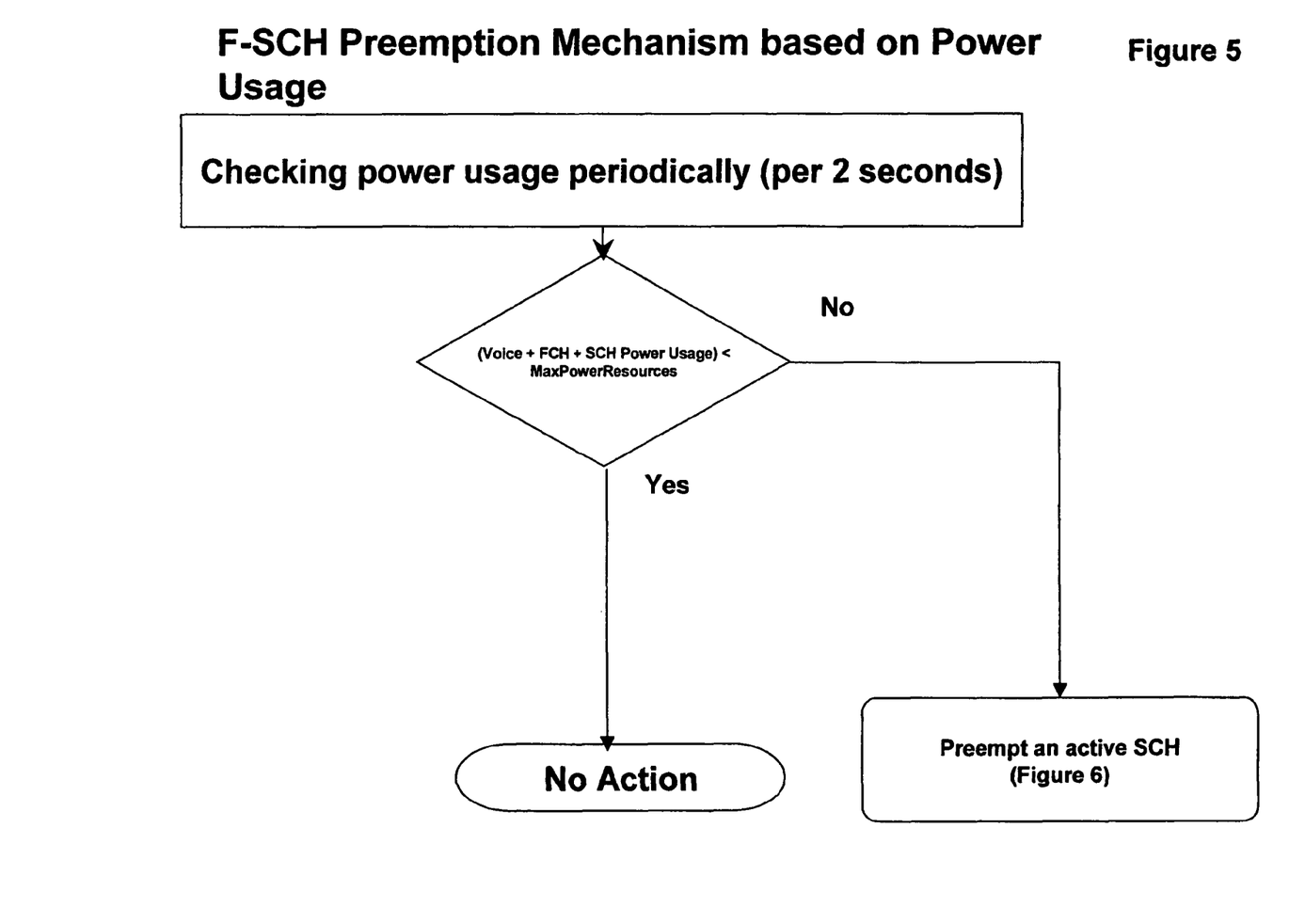
FIG. 5 is a flowchart illustrating a further portion of the process carried out by an embodiment of the invention.

Otherwise, the new FCH request is Queued 260 and an SCH Pre-emption request 270 occurs FIG. 5 is a flowchart illustrating a SCH Preemption process based on a Power Usage check based on current power usage, according to an embodiment of the invention. This is optional, but preferred, as all new calls would be blocked if power resources are fully utilized. According to a preferred embodiment, rather than blocking all new calls in response to a maximum power check, an active SCH is pre-empted (if possible) in order to free up power resources. In the implementation shown, the total power used on each sector is estimated every two seconds. However, for some applications, e.g., Push to Talk (PTT), a large number of FCH data calls may be required to be established within the 2 seconds. Consequently, to avoid the total sector power exceeding its maximum power when allocating F-FCH and F-SCH this power check can additionally occur in response to each new request. The power usage during call set up is difficult to measure, but it can be estimated. The initial power during an FCH call set up can be estimated based on the average value of the power used by the current active FCH calls.

The initial power during an SCH call set up can be estimated based on a table look up based on its FCH power and data rate.

Figure 6:
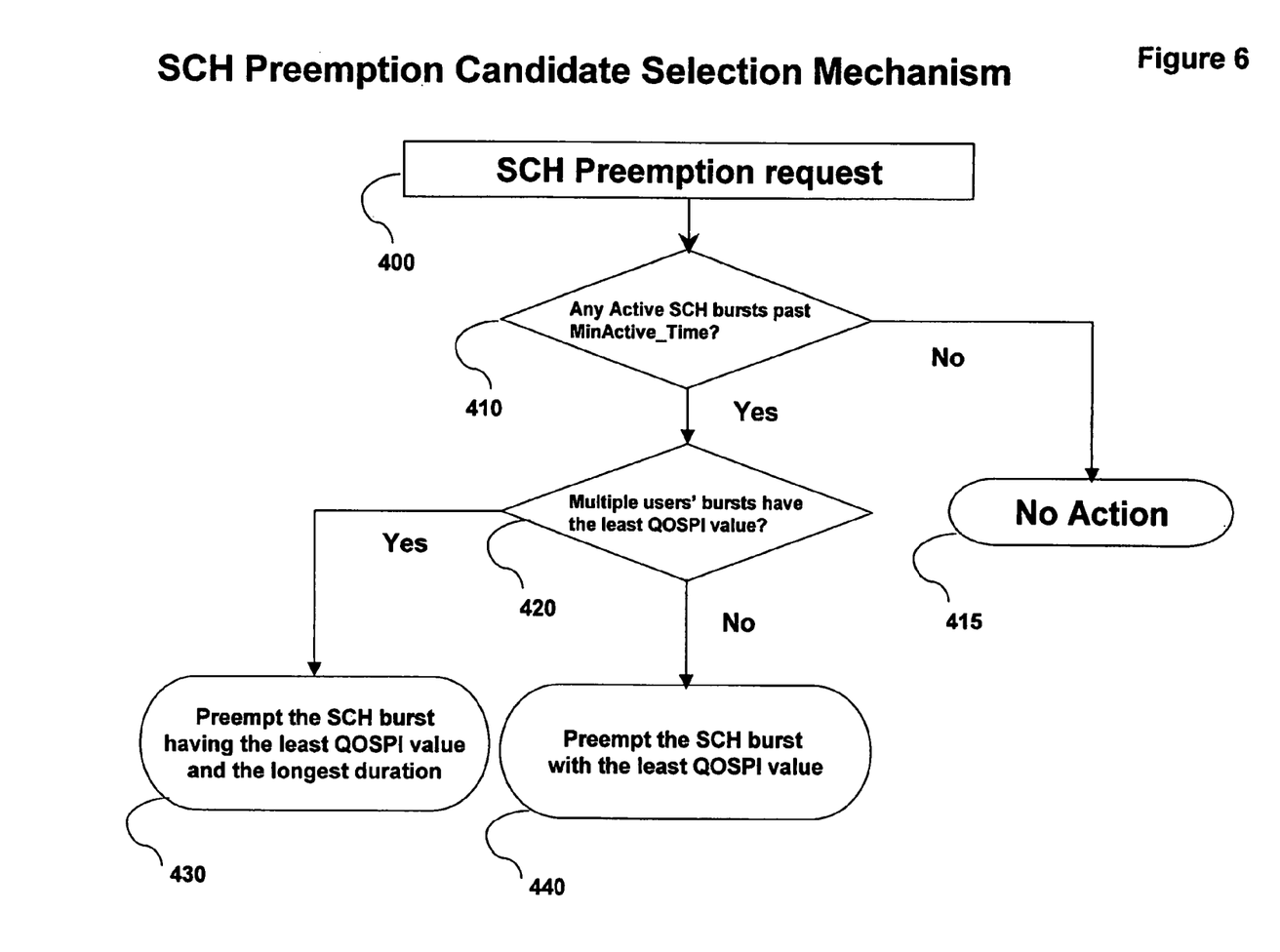
FIG. 6 is a flowchart illustrating a further portion of the process carried out by an embodiment of the invention.

FIG. 6 illustrates process for responding to a pre-emption request, according to an embodiment of the invention. The pre-emption request 400 can originate from a new call -or hand off request (e.g., from FIGS. 3 or 4) or from a power check (e.g., FIG. 5). As shown, the system first determines if it can actually pre-empt to satisfy pre-emption request, and if so how to select which data SCH or data SCHes are pre-empted. The candidate for preemption shall be selected as a data SCH that passes a minimum active time (MinActive_Time) check 410 and belongs to the user with the least QOSPI (Quality of Service Priority Indicator) 440.

If multiple users have the least QOSPI value with their data bursts having passed the minimum active time, the longest active burst among those users will be selected as the candidate for preemption 430. Other tie-breaking criteria can be used, including the size, duration and completeness of an SCH transmission, or its subscriber priority if applicable.

Alternatively the system can select the longest active SCH as the candidate for preemption, irrespective of the QOSPI The first step in this process is to determine whether there are any data SCHes past MinActive_Time 410. This check is preferably made to ensure when a data SCH is assigned to a user, it should be used at least for a configurable duration of time before it is released. This is done to prevent wasting the signaling efforts of setting up the data SCH and also to avoid the "ping-pong" effect of repeatedly setting up/tearing down the data SCH.

Figure 7:
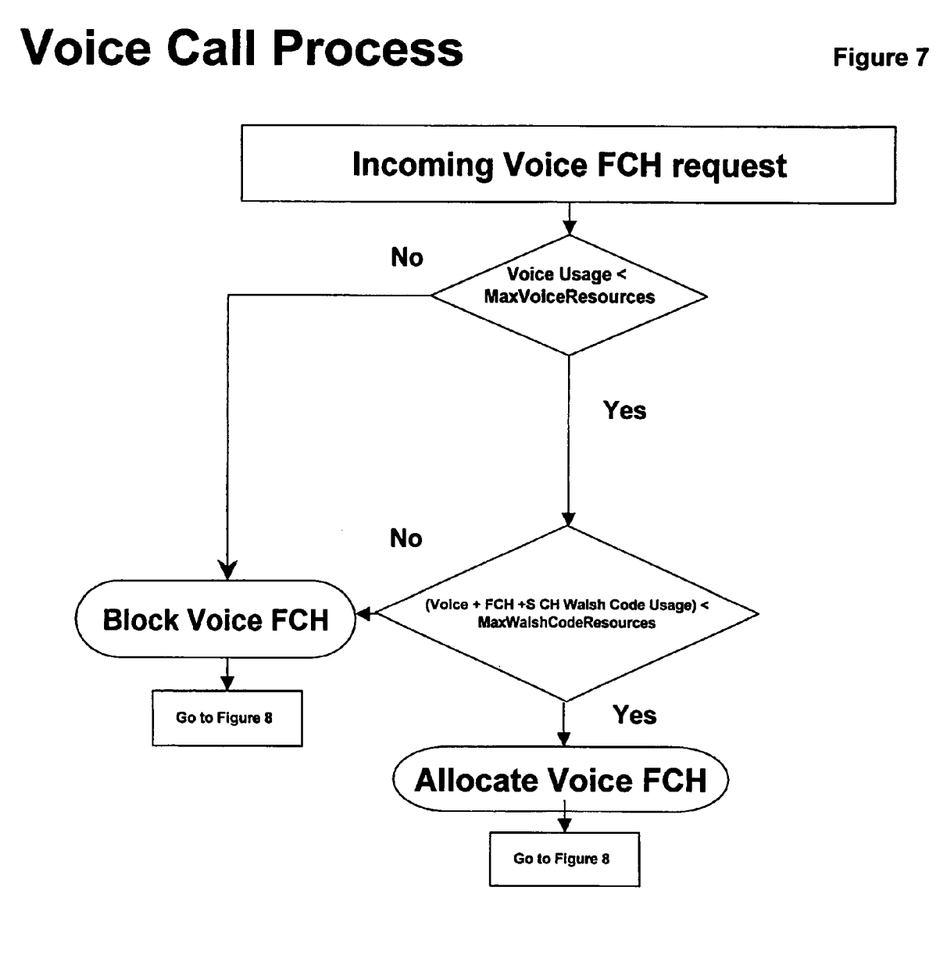
FIG. 7 is a flowchart illustrating a further portion of the process carried out by an embodiment of the invention.

FIG. 7 illustrates a conventional process for handling voice channels, with the exception that the system then proceeds to check whether sufficient headroom exists, as shown in FIG. 8.

FIG. 8 illustrates a process, according to an embodiment of the invention, to ensure sufficient head room is reserved. If sufficient head room resources are maintained, than nothing happens. However, if there are insufficient head room resources, than a pre-emption request is made.

As should be apparent to a person skilled in the art, the above described processes are typically implemented by a Radio Resource Manager (RRM) of the Base Station. This is typically implemented in software executed on a processor in the base station.

Those skilled in the art will appreciate that in some embodiments, certain functionality may be implemented as pre-programmed hardware or firmware elements (e.g., application specific integrated circuits (ASICs), electrically erasable programmable read-only memories (EEPROMs), etc.), or other related components. In other embodiments, the system or sub-systems may comprise an arithmetic and logic unit (ALU) having access to a code memory (not shown) which stores program instructions for the operation of the ALU in order to implement the functional entities and execute the various processes and functions described above. The program instructions could be stored on a medium which is fixed, tangible and readable directly (e.g., flash memory, CD-ROM, ROM, or fixed disk), or the program instructions could be stored remotely but transmittable to the base station, for example via its backhaul network.

Note that the embodiments described herein assume that the voice resources are guaranteed, and they are therefore not allowed to be used, even if they are underutilized and the data resources are fully utilized. However, unused voice resources can also be "borrowed" in a similar manner. For example, rather than blocking a data call, unused voice resources can be allocated to a data call request. However, assuming voice calls have a higher priority, data calls can be pre-empted to satisfy subsequent voice calls, if necessary, in a similar manner.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A base station comprising:
   a. means for receiving a request for a data session;
   b. means for comparing resource usage with available resources to determine whether sufficient resources are available, said means for comparing including first means for determining if a first set of resources, including Walsh code resources, are available and second means for determining if a second set of resources, including power resources, are available, said first means being configured to determine whether sufficient resources from the first set of resources are available in response to said request, said second means being configured to determine whether sufficient resources from the second set of resources are available other than in response to said request;
   c. means for allocating the resources if available to satisfy said request; and
   d. if insufficient resources are available, means for generating a pre-emption request, means for determining, in response to the pre-emption request, whether sufficient resources can be made available by pre-empting a session without a real-time requirement, and means for pre-empting the session without the real-time requirement in order to make the resources available upon determination that sufficient resources can be made available by pre-emption, and means for blocking said request for the data session while maintaining the session without the real-time requirement upon determination that sufficient resources cannot be made available by pre-emption.

2. The base station as claimed in claim 1 wherein means for pre-empting the session without the real-time requirement comprises means for decreasing sufficient resources allocated to the session without the real-time requirement to satisfy said request.

3. A method of allocating wireless resources at a base station comprising:
   a. comparing resource usage with available resources to determine whether sufficient resources are available for an incoming high priority service, said resources including a first set of resources, which includes Walsh code resources, and a second set of resources, which includes power resources;
   b. if insufficient resources are available for said incoming service, generating a pre-emption request;
   c. determining, in response to the pre-emption request, whether sufficient resources can be made available by pre-empting a low priority service;
   d. upon determination that sufficient resources can be made available by pre-emption, pre-empting the low priority service in order to make the resources available; and
   e. upon determination that sufficient resources cannot be made available by pre-emption, blocking the incoming high priority service while maintaining the low priority service;
   wherein said comparing step is carried out in relation to said first set of resources in response to receiving a request for a service, and said comparing step is carried out in relation to said second set of resources other than in response to a request for a service.

4. The method as claimed in claim 3, wherein said high priority service comprises a data call with a real-time requirement which uses a fundamental channel (FCH) and wherein said low priority service comprises a data call without a real-time requirement, but which uses a Supplemental channel (SCH) for additional bandwidth.

5. The method as claimed in claim 4, wherein said request is a hand-off request requiring a FCH.

6. The method as claimed in claim 4, wherein said base station supports a plurality of users of an SCH, with each user allocated a service metric and step d comprises selecting a user with the lowest service metric to pre-empt.

7. The method as claimed in claim 6, wherein pre-empting a low-priority service comprises reducing sufficient resources allocated to a selected service to satisfy said request.

8. The method as claimed in claim 6, wherein pre-empting a low-priority service comprises dropping a selected user SCH to satisfy said request.

9. The method as claimed in claim 4, wherein step d comprises, prior to pre-empting an SCH, evaluating the FCH usage, and only pre-empt an SCH if the FCH usage has not exceeded an upper limit.

10. The method as claimed in claim 6 wherein said service metric comprises a Quality of Service Priority Indicator (QoSPI).

11. The method as claimed in claim 3, further comprising maintaining a headroom of resources and pre-empting the low priority service in response to an event which reduces said headroom beyond a threshold.

12. A method of controlling a base station of a wireless network to allocate resources between delay sensitive services and non delay sensitive services, said method executed by one or more processors within said wireless network, said method comprising:
   a. establishing a first threshold for said delay sensitive services and a second threshold for said non delay sensitive services;
   b. allocating resources to each service on an as requested basis provided neither threshold is reached;
   c. if said second threshold is reached and there is additional demand for said non delay sensitive services and said first threshold is not reached, then allocating resources to said non delay sensitive services beyond said second threshold; and
   d. if resources are allocated to said non delay sensitive services beyond said second threshold, and said first threshold is not reached and there is demand for said delay sensitive services for which there are insufficient resources available, then generating a pre-emption request, and determining, in response to the pre-emption request, whether sufficient resources can be made available by pre-empting resources from said non delay sensitive services, upon determination that sufficient resources can be made available by pre-emption allocating resources to said delay sensitive services by pre-empting resources from said non delay sensitive services, upon determination that sufficient resources cannot be made available by pre-emption, blocking a request for said delay sensitive service while maintaining said non delay sensitive service, said resources including a first set of resources, which includes Walsh code resources, and a second set of resources which includes power resources, said pre-empting occurring in response to receiving a request for a service for said first set of resources, and other than in response to a request for a service for said second set of resources.

13. The method as claimed in claim 12 wherein step d comprises reducing resources allocated to one or more users of said non delay sensitive services based on a criterion.

14. The method as claimed in claim 13 wherein a service metric is allocated to each user of said non delay sensitive services and wherein said criterion comprises determining which user or users have the lowest service metric.

15. The method as claimed in claim 14 wherein said service metric comprises a Quality of Service Priority Indicator (QoSPI).

16. The method as claimed in claim 12, further comprising maintaining a headroom of resources and pre-empting said non delay sensitive service in response to an event which reduces said headroom beyond a threshold.

17. A non-transient computer-readable storage medium comprising a tangible program element for execution by a processor within a base station, the program element comprising computer-readable program code for:
 a. comparing resource usage with available resources to determine whether sufficient resources are available for an incoming high priority service, said resources including a first set of resources, which includes Walsh code resources, and a second set of resources which includes power resources;
 b. if insufficient resources are available for said incoming service, generating a pre-emption request;
 c. determining, in response to the pre-emption request, whether sufficient resources can be made available by pre-empting a low priority service;
 d. upon determination that sufficient resources can be made available by pre-emption, pre-empting the low priority service in order to make the resources available; and
 e. upon determination that sufficient resources cannot be made available by pre-emption, blocking the incoming high priority service while maintaining the low priority service;
 wherein said comparing resource usage and pre-empting occurring both in response to receiving a request for said incoming high priority service for said first set of resources and other than in response to receiving a request for said incoming high priority service for said second set of resources in order to make sufficient resources available for said incoming high priority service on an ongoing basis.

18. A non-transient computer-readable storage medium as claimed in claim 17 wherein said high priority service comprises a data session with a real-time requirement which uses a fundamental channel (FCH) and wherein said low priority service comprises a data session without a real-time requirement, but which uses a Supplemental channel (SCH) for additional bandwidth.

19. A non-transient computer-readable storage medium as claimed in claim 18 wherein said base station supports a plurality of users of an SCH, with each user allocated a service metric and wherein pre-empting the low priority service includes selecting a user with the lowest service metric to pre-empt.

20. A non-transient computer-readable storage medium as claimed in claim 19 wherein the tangible program element comprises computer-readable program code for maintaining a headroom of resources and pre-empting the low priority service in response to an event which reduces said headroom beyond a threshold.

* * * * *